US006958085B1

(12) United States Patent
Parrish

(10) Patent No.: US 6,958,085 B1
(45) Date of Patent: Oct. 25, 2005

(54) HIGH PERFORMANCE IMMOBILIZED LIQUID MEMBRANE FOR CARBON DIOXIDE SEPARATIONS

(75) Inventor: Clyde F. Parrish, Melbourne, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 205 days.

(21) Appl. No.: 10/666,821

(22) Filed: Sep. 17, 2003

Related U.S. Application Data

(60) Provisional application No. 60/458,874, filed on Mar. 26, 2003.

(51) Int. Cl.$^7$ .................. B01D 53/22; B01D 179/00
(52) U.S. Cl. .................. 95/44; 95/51; 96/5; 96/10; 423/226
(58) Field of Search ............... 95/44, 51; 96/4, 96/5, 10; 423/220, 226

(56) References Cited

U.S. PATENT DOCUMENTS

| | | | |
|---|---|---|---|
| 3,396,510 A | | 8/1968 | Ward |
| 3,447,286 A | | 6/1969 | Dounoucos |
| 4,187,086 A | * | 2/1980 | Walmet et al. .................. 95/44 |
| 4,548,196 A | * | 10/1985 | Torobin ....................... 126/654 |
| 4,637,990 A | * | 1/1987 | Torobin ....................... 502/10 |
| 4,671,909 A | * | 6/1987 | Torobin ....................... 264/43 |
| 4,761,164 A | | 8/1988 | Pez et al. |
| 4,780,114 A | | 10/1988 | Quinn et al. |
| 4,793,980 A | * | 12/1988 | Torobin ................... 423/213.5 |
| 4,954,145 A | * | 9/1990 | Thakore et al. ................ 95/44 |
| 5,110,326 A | | 5/1992 | Sirkar et al. |
| 5,135,547 A | * | 8/1992 | Tsou et al. ..................... 95/44 |
| 5,342,432 A | | 8/1994 | Haubs et al. |
| 5,409,524 A | | 4/1995 | Jensvold et al. |
| 5,702,503 A | | 12/1997 | Tse Tang |
| 5,766,317 A | * | 6/1998 | Cable et al. ................... 96/10 |
| 5,876,486 A | | 3/1999 | Steinwandel et al. |
| 6,156,096 A | * | 12/2000 | Sirkar .......................... 95/44 |
| 6,228,145 B1 | * | 5/2001 | Falk-Pedersen et al. ....... 95/44 |

* cited by examiner

*Primary Examiner*—Robert H. Spitzer
(74) *Attorney, Agent, or Firm*—Randall M. Heald; Gary G. Borda; Guy Miller

(57) ABSTRACT

An immobilized liquid membrane has a substrate. A plurality of capsules is disposed on the substrate. Each of the capsules is permeable to a first gas of a mixture of gasses comprising the first gas and a second gas. Each of the capsules is substantially impermeable to the second gas. A liquid is disposed in each of the capsules that is permeable to the first gas and substantially impermeable to the second gas.

26 Claims, 4 Drawing Sheets

HIGH PERFORMANCE IMMOBILIZED LIQUID MEMBRANE FOR CARBON DIOXIDE SEPARATIONS

CROSS REFERENCE TO RELATED APPLICATIONS

This application claims priority to U.S. Provisional Patent Application Ser. No. 60/458,874 filed Mar. 26, 2003 and titled "HIGH PERFORMANCE IMMOBILIZED LIQUID MEMBRANE FOR CARBON DIOXIDE SEPARATIONS", which is commonly assinged and incorporated by reference herein.

STATEMENT OF GOVERNMENT INTEREST

The invention described herein was made by an employee of the United States Government and may be manufactured and used by or for the Government of the United States of America for governmental purposes without the payment of any royalties thereon or therefor.

TECHNICAL FIELD OF THE INVENTION

The present invention relates generally to gas separation and in particular the present invention relates to immobilized liquid membranes for separating gasses.

BACKGROUND

There is a current need to remove carbon dioxide from spacecraft habitats, space suits, such as EMU (Extravehicular Mobility Units), during Extra Vehicular Activities (EVA), as well as to remove carbon dioxide from combustion processes. For EVA applications, carbon dioxide is captured in absorbent materials and later transported back to earth for disposal. Likewise, similar methods are followed when the carbon dioxide is captured within the spacecraft.

Carbon dioxide created during combustion processes is believed to be a contributor to global warming and could be greatly reduced if a significant amount of the carbon dioxide could be captured within a power plant and not released to the surrounding atmosphere. In fact, the captured carbon dioxide may actually be put to useful applications. For example, carbon dioxide is currently pumped into oil wells to provide for secondary recovery of crude oil. In addition, carbon dioxide is being considered for microalgae cultivation, which could be co-fired with coal. Results of investigations indicate several positive results. Carbon dioxide is also being considered for production of methane from deep unreachable coal seams as well as to enhance biomass production.

Conventional immobilized liquids have been known to be volatile and would tend to evaporate when confronted by long-term exposure to the vacuum of space. For that reason, immobilized liquids generally cannot be utilized as an interface between an EMU and space. Other applications, such as removal of carbon dioxide from the flue gas of coal-fired power plants would volatilize the immobilized liquids.

For the reasons stated above, and for other reasons stated below which will become apparent to those skilled in the art upon reading and understanding the present specification, there is a need in the art for alternatives for carbon dioxide removal.

SUMMARY

The above-mentioned problems with carbon dioxide removal and other problems are addressed by the present invention and will be understood by reading and studying the following specification.

One embodiment of the present invention provides an immobilized liquid membrane that has a substrate. A plurality of capsules is disposed on the substrate. Each of the capsules is permeable to a first gas of a mixture of gasses comprising the first gas and a second gas. Each of the capsules is substantially impermeable to the second gas. A liquid is disposed in each of the capsules that is permeable to the first gas and substantially impermeable to the second gas.

Another embodiment of the present invention provides a method for manufacturing an immobilized liquid membrane. The method includes encapsulating a liquid in each of a plurality of capsules. Each of the capsules and the liquid are permeable to a first gas of a mixture of gasses comprising the first gas and a second gas. Each of the capsules and the liquid are substantially impermeable to the second gas. Disposing the liquid-containing capsules on a porous substrate and permeating the porous substrate and the liquid-containing capsules with a monomer are included in the method. The method further includes polymerizing the monomer to chemically bond the capsules to each other and the porous substrate.

Further embodiments of the invention include methods and apparatus of varying scope.

DETAILED DESCRIPTION

Figure 1:
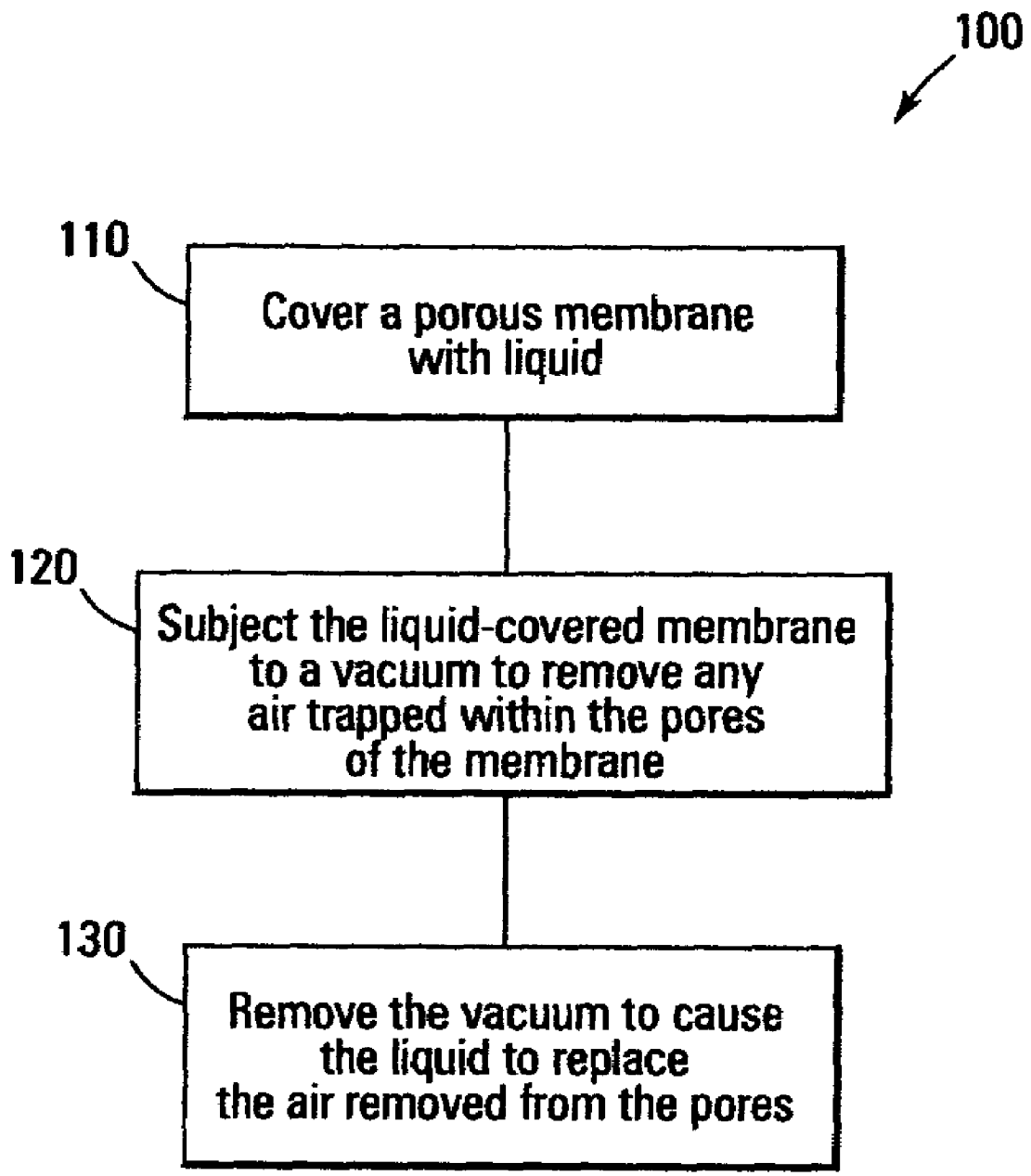
FIG. 1 is a flowchart of a method for making an immobilized liquid membrane according to an embodiment of the present invention.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

Embodiments of the present invention provide immobilized liquid membranes capable of separating a first gas, such as carbon dioxide, from a second gas, such as at least one of oxygen, nitrogen, and carbon monoxide, in mixture therewith. The immobilized liquid membranes may be used in spacecraft, extra vehicular activities, and combustion processes that generate hot flue gases.

Figure 2:
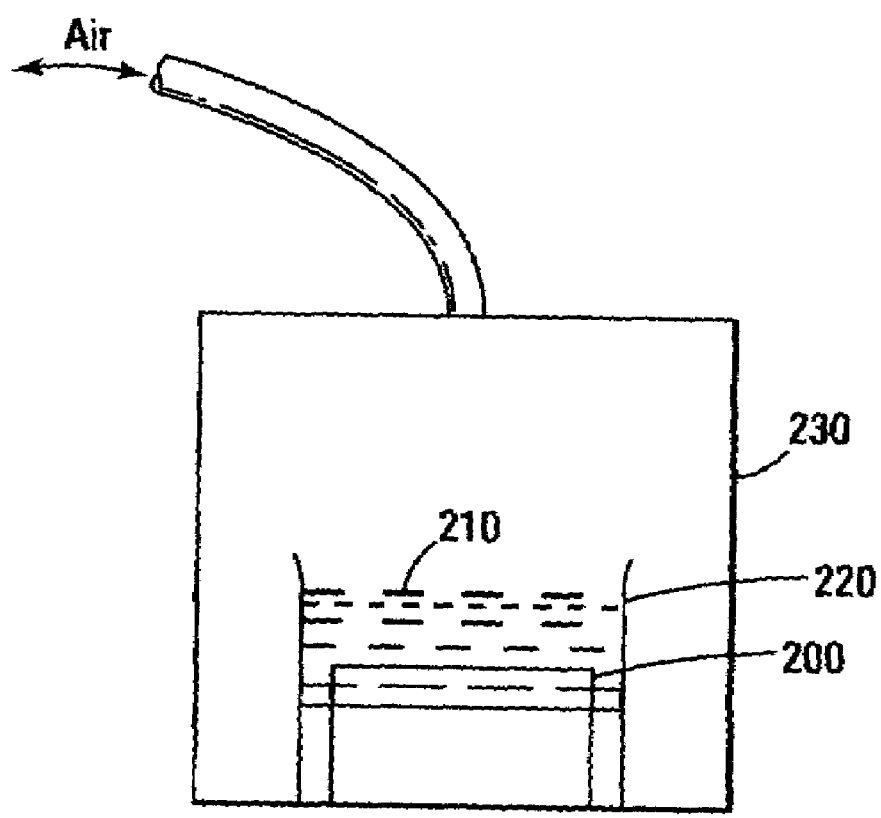
FIG. 2 illustrates an apparatus used in making an immobilized liquid membrane according to another embodiment of the present invention.

FIG. 1 is a flowchart of a method 100 for making an immobilized liquid membrane according to an embodiment of the present invention. At block 110, a porous substrate (or membrane) 200 is covered with a substantially nonvolatile liquid 210 disposed in an open container 220, as illustrated in FIG. 2, according to another embodiment of the present invention. This can be accomplished by either placing substrate 200 into container 220 first and then adding liquid 210 to container 220 to cover substrate 200 or adding liquid 210 to container 220 first and then immersing substrate 200 in liquid 210. Liquid 210 is selectively permeable to a gas that is to be separated from one or more other gasses. Specifically, liquid 210 is permeable to the gas that is to be separated from the one or more other gasses, but substantially impermeable to the other gasses. For one embodiment, liquid 210 is selectively permeable to carbon dioxide and is substantially impermeable to at least one of oxygen, carbon monoxide, and nitrogen.

For one embodiment, substrate 200 is of nylon, cellulose, polypropylene, etc. For another embodiment, liquid 210 is an ionic liquid, such as 1-butyl-3-methylimidazolium hexaflurophosphate, 1-hexyl-3-methylimidazolium hexaflurophosphate, 1-butyl-4-methypyridinum hexaflurophosphate, etc.

At block 120, the liquid-covered substrate 200 is subjected to a vacuum to remove any air trapped in the pores of substrate 200. For one embodiment, this involves placing container 220 into a chamber 230, such as bell jar, as shown in FIG. 2, and sucking air from the chamber using a vacuum pump, for example. At block 130, the vacuum is removed to cause liquid 210 to flow into any pores that previously contained air. For one embodiment, blocks 120 and 130 are repeated a number of times to completely remove the air, which is indicated by the absence of air bubbles flowing from the liquid-covered substrate 200 through liquid 210. After substantially all of the air is removed from substrate 200, substrate 200 is removed from container 220 and chamber 230 and any excess ionic liquid 210 is removed from a surface of substrate 200.

Figure 3:
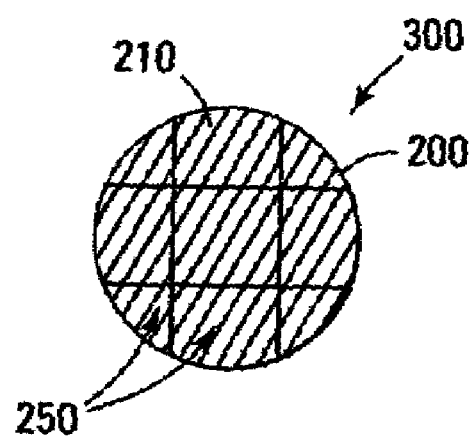
FIG. 3 illustrates an immobilized liquid membrane according to another embodiment of the present invention.

FIG. 3 illustrates an immobilized liquid membrane 300 that includes substrate 200 impregnated with liquid 210 according to another embodiment of the present invention. Specifically, liquid 210 is contained within pores 250 of substrate 200. For one embodiment, a surface tension of liquid 210 maintains liquid 210 within pores 250.

In operation, membrane 300 selectively separates a gas, such as carbon dioxide, from other gasses, such as carbon monoxide, nitrogen, oxygen, etc. For example, for one embodiment, carbon dioxide in mixture with at least one of carbon monoxide, nitrogen, and oxygen is located on a first side of membrane 300. An environment on a second side of membrane 300 is maintained so that the pressure of any carbon dioxide on the second side is less than the partial pressure of the carbon dioxide within the mixture on the first side. When the mixture on the first side contacts membrane 300, the carbon dioxide passes through the pores 250 containing liquid 210 because liquid 210 is permeable to carbon dioxide, whereas carbon monoxide, nitrogen, and/or oxygen do not substantially pass through membrane 300 because liquid 210 is substantially impermeable to carbon monoxide, nitrogen, and/or oxygen.

For one embodiment, membrane 300 has a selectivity defined as the ratio of the permeability of membrane 300 to a substance, e.g., carbon dioxide, to be passed by membrane 300 to the permeability of membrane 300 to a substance to be substantially blocked by membrane 300, e.g., oxygen, carbon dioxide, nitrogen, etc. For example, for separating carbon dioxide from oxygen, an exemplary permeability of membrane 300 to oxygen may be 10 and an exemplary permeability to carbon dioxide may be 50000, giving a selectivity of 5000. For another embodiment, membrane 300 has a selectivity of 1000 for carbon dioxide over carbon monoxide, nitrogen, or oxygen.

Figure 4:
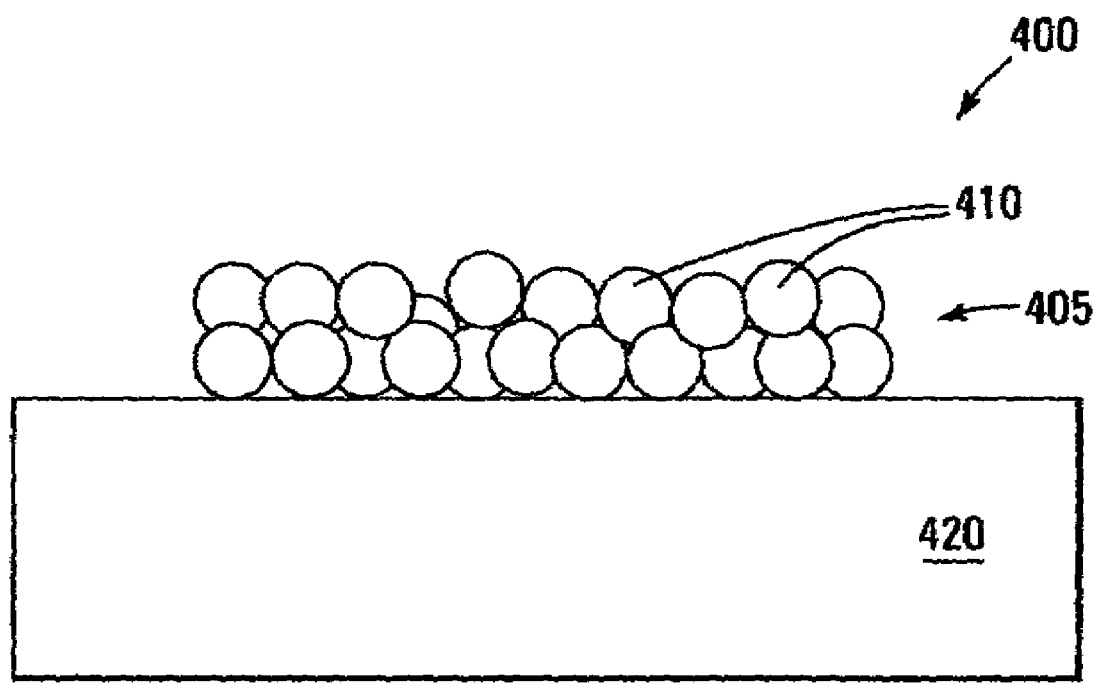
FIG. 4 illustrates an immobilized liquid membrane according to yet another embodiment of the present invention.
Figure 5:
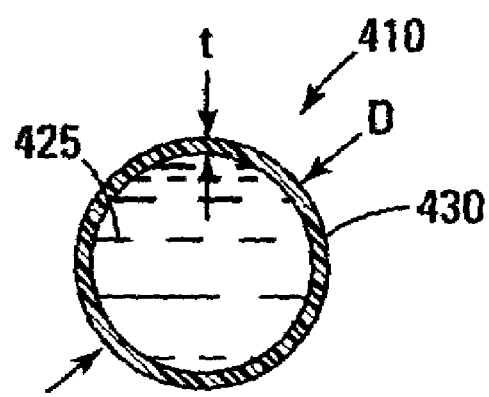
FIG. 5 is an enlarged view of a capsule of the immobilized liquid membrane of FIG. 4.

FIG. 4 illustrates an immobilized liquid membrane 400 according to another embodiment of the present invention. Immobilized liquid membrane 400 includes a coating (or film) 405 of capsules 410 disposed on a porous substrate (or membrane) 420, where substrate 420 supports film 405. FIG. 5 is an enlarged view of a capsule 410. Capsule 410 encapsulates a liquid 425 that is selectively permeable to a gas, such as carbon dioxide, that is to be separated from one or more other gasses, such as oxygen, carbon monoxide, nitrogen, etc. Specifically, liquid 425 is permeable to the gas that is to be separated from the one or more other gasses, but substantially impermeable to the other gasses. For separating carbon dioxide from at least one of oxygen, carbon monoxide, and nitrogen, liquid 425 can be an ionic liquid, a 1 to 2 molar solution of sodium glycinate in glycerol, water, etc. Capsule 410 acts to reduce evaporation of liquid 425, so that liquid 425 can be either a volatile or a substantially nonvolatile liquid.

Capsule 410 includes a shell (or wall) 430 that surrounds liquid 425. For one embodiment, capsule 410 is a microcapsule having a diameter D of about 1 (one) micron. For other embodiments, shell 430 has a thickness t of about 0.1 micron or less. For another embodiment, capsule 410 is spherical, as shown, elliptical, etc. Shell 430 and porous substrate 420 can be of any material that is selectively permeable to a gas that is to be separated from one or more other gasses. Specifically, the material of shell 430 is permeable to the gas that is to be separated from the one or more other gasses, but substantially impermeable to the other gasses. For separating carbon dioxide from at least one of oxygen, carbon monoxide, and nitrogen, shell 430 and porous substrate 420 can be polyvinyl chloride (PVC), polystyrene, etc. Another suitable material for porous substrate 420 is silicone rubber.

Figure 6:
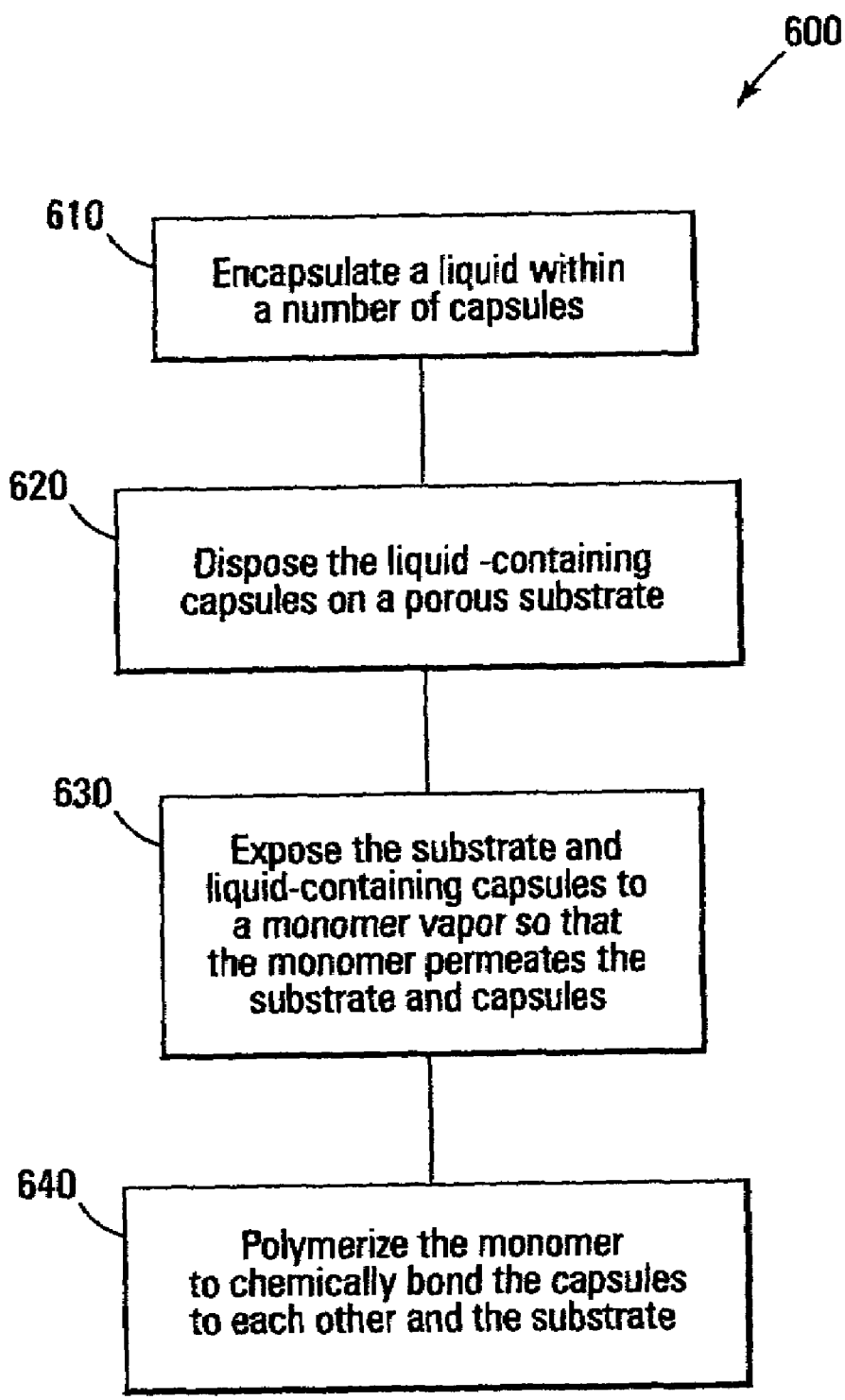
FIG. 6 is a flowchart of a method for making an immobilized liquid membrane according to another embodiment of the present invention.

FIG. 6 is a flowchart of a method 600 for making immobilized liquid membrane 400 according to another embodiment of the present invention. At block 610, liquid 425 is encapsulated within capsules 410. Encapsulating liquids is well understood and will not be described herein. The liquid-containing capsules 410 are disposed on substrate 420 to form layer 405 at block 620. At block 630, substrate 420 and the liquid-containing capsules 410 are exposed to a monomer vapor so that the monomer vapor permeates substrate 420 and shell 430 of each of the liquid-containing capsules 410. This treats substrate 420 and shell 430 with the monomer vapor. For one embodiment, the monomer is an ultraviolet-light sensitive, x-ray sensitive, or heat-sensitive monomer, or the like. For another embodiment, the monomer is a monomer of the material of capsules 410. For example, when capsules 410 are of polyvinyl chloride (PVC), the monomer is vinyl chloride, and when capsules 410 are of polystyrene, the monomer is styrene. For other embodiments, the monomer is a monomer of the material of capsules 410 and of substrate 420.

At block 640, the monomer is polymerized to chemically bond capsules 410 to each other and to substrate 420. For one embodiment, the monomer-treated substrate 420 and capsules 410 are irradiated, e.g., by exposing them to ultraviolet light, x-rays, etc., are heated, or the like to initiate the polymerization.

In operation, membrane 400 selectively separates a gas, such as carbon dioxide, from other gasses, such as carbon monoxide, nitrogen, oxygen, etc. For example, for one embodiment, carbon dioxide in mixture with at least one of carbon monoxide, nitrogen, and oxygen is located on a first side of membrane 400. An environment on a second side of membrane 400 is maintained so that the pressure of any carbon dioxide on the second side is less than the partial pressure of the carbon dioxide within the mixture on the first side. When the mixture on the first side contacts film 405, the carbon dioxide passes through capsules 410 because the shell 430 of each of capsules 410 and the liquid 425 contained within the shell 430 are permeable to carbon dioxide, whereas carbon monoxide, nitrogen, and/or oxygen do not substantially pass through capsules 410 because the shell 430 of each of capsules 410 and the liquid 425 contained within the shell 430 are substantially impermeable to carbon monoxide, nitrogen, and/or oxygen. Subsequently, the carbon dioxide passes through substrate 420.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A method of separating gasses, the method comprising:
    passing a first gas of a mixture of gasses comprising the first gas and a second gas through each of a plurality of capsules disposed on a porous substrate, wherein each of the capsules comprises:
        a shell that is permeable to the first gas and substantially impermeable to the second gas; and
        a liquid contained within the shell that is permeable to the first gas and substantially impermeable to the second gas; and
    passing the first gas through the porous substrate wherein the porous substrate is permeable to the first gas and substantially impermeable to the second gas.

2. The method of claim 1, wherein the first gas is carbon dioxide.

3. The method of claim 2, wherein the second gas is at least one of oxygen, nitrogen, and carbon monoxide.

4. An immobilized liquid membrane comprising:
    a substrate;
    a plurality of capsules disposed on the substrate, each of the capsules permeable to a first gas of a mixture of gasses comprising the first gas and a second gas, each of the capsules substantially impermeable to the second gas; and
    a liquid disposed in each of the capsules that is permeable to the first gas and substantially impermeable to the second gas.

5. The immobilized liquid membrane of claim 4, wherein the capsules are microcapsules.

6. The immobilized liquid membrane of claim 4, wherein the liquid is a volatile liquid or a substantially nonvolatile liquid.

7. The immobilized liquid membrane of claim 4, wherein the liquid is an ionic liquid, a solution of sodium glycinate in glycerol, or water.

8. The immobilized liquid membrane of claim 4, wherein the substrate is permeable to the first gas and substantially impermeable to the second gas.

9. The immobilized liquid membrane of claim 4, wherein the first gas is carbon dioxide.

10. The immobilized liquid membrane of claim 9, wherein the second gas is at least one of oxygen, nitrogen, and carbon monoxide.

11. The immobilized liquid membrane of claim 4, wherein the substrate is porous.

12. The immobilized liquid membrane of claim 4, wherein the capsules are chemically bonded to each other and to the substrate.

13. The immobilized liquid membrane of claim 4, wherein the capsules are of polyvinyl chloride or polystyrene.

14. An immobilized liquid membrane capable of separating carbon dioxide from at least one other gas in mixture therewith, the immobilized liquid membrane comprising:
    a porous substrate of a material that is permeable to the carbon dioxide and substantially impermeable the at least one other gas;
    a plurality of capsules disposed on the substrate, each of the capsules permeable to the carbon dioxide and substantially impermeable the at least one other gas; and
    a liquid disposed in each of the capsules that is permeable to the carbon dioxide and substantially impermeable the at least one other gas.

15. The immobilized liquid membrane of claim 14, wherein the liquid is an ionic liquid, a solution of sodium glycinate in glycerol, or water.

16. The immobilized liquid membrane of claim 14, wherein the capsules are of polyvinyl chloride or polystyrene.

17. The immobilized liquid membrane of claim 14, wherein the at least one other gas is at least one of oxygen, nitrogen, and carbon monoxide.

18. A method for manufacturing an immobilized liquid membrane, the method comprising:
    encapsulating a liquid in each of a plurality of capsules, each of the capsules and the liquid permeable to a first gas of a mixture of gasses comprising the first gas and a second gas, each of the capsules and the liquid substantially impermeable to the second gas;
    disposing the liquid-containing capsules on a porous substrate;
    permeating the porous substrate and the liquid-containing capsules with a monomer; and
    polymerizing the monomer to chemically bond the capsules to each other and the porous substrate.

19. The method of claim 18, wherein permeating the porous substrate and the liquid-containing capsules with the monomer comprises exposing the porous substrate and the liquid-containing capsules to vapors of the monomer.

20. The method of claim 18, wherein permeating the porous substrate and the liquid-containing capsules with a monomer comprises using an ultraviolet-light sensitive monomer.

21. The method of claim 20, wherein polymerizing the monomer is initiated by exposing the porous substrate and the liquid-containing capsules to ultraviolet light.

22. The method of claim 18, wherein permeating the porous substrate and the liquid-containing capsules with a monomer comprises using a monomer of the material of the capsules.

23. The method of claim 18, wherein encapsulating a liquid in each of a plurality of capsules comprises encapsulating the liquid in each of a plurality microcapsules.

24. The method of claim 18, wherein encapsulating a liquid in each of the plurality of capsules comprises encapsulating an ionic liquid, a solution of sodium glycinate in glycerol, or water in each of the plurality of capsules.

25. The method of claim 18, wherein the first gas is carbon dioxide.

26. A method for manufacturing an immobilized liquid membrane, the method comprising:

encapsulating a liquid in each of a plurality of microcapsules, each of the microcapsules and the liquid permeable to a first gas of a mixture of gasses comprising the first gas and a second gas, each of the capsules and the liquid substantially impermeable to the second gas;

disposing the liquid-containing microcapsules on a porous substrate;

exposing the porous substrate and the liquid-containing microcapsules to vapors of an ultraviolet-light sensitive monomer; and exposing the porous substrate and the liquid-containing microcapsules to ultraviolet light to initiate polymerization of the monomer to chemically bond the microcapsules to each other and the porous substrate.

* * * * *